Figure 1:
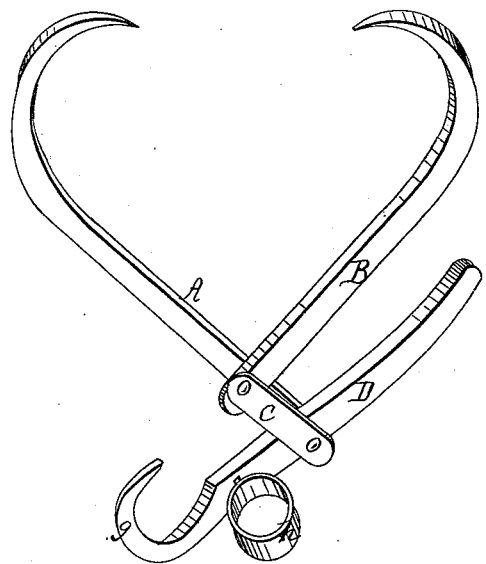

Hicks & Doty,
Grapple.

N° 77,375. Patented Apr. 28, 1868.

Witnesses.
V. D. Stockbridge
A. N. Marr

Inventor:
David Hicks
Sidney Doty
her Alexander Mason
attys

United States Patent Office.

DAVID HICKS AND SIDNEY DOTY, OF PONTIAC, ASSIGNORS TO THEMSELVES, JEROME B. SWEETLAND, CHARLES E. ADAMS, SAMUEL N. BRONSON, AND ALONZO BARBOUR, OF OAKLAND, MICHIGAN.

Letters Patent No. 77,375, dated April 28, 1868.

IMPROVEMENT IN RAFTER-HOOK FOR HOISTING-APPARATUS.

The Schedule referred to in these Letters Patent and making part of the same.

TO ALL WHOM IT MAY CONCERN:

Be it known that we, DAVID HICKS and SIDNEY DOTY, of the city of Pontiac, in the county of Oakland, and in the State of Michigan, have invented new and useful Improvements in Rafter-Hooks for Hoisting-Apparatus; and do hereby declare that the following is a full, clear, and exact description thereof, reference being had to the accompanying drawings, and the letters of reference marked thereon.

In the annexed drawings, making a part of this specification, A and B represent hooks, made curved, as shown, and pivoted together at or near the extremities of their shanks. The hook A is made with a shank somewhat longer than the hook B, and has pivoted to its extremity the lever D.

C represents a metallic strap, which serves as a double washer and brace to the hooks A and B and the hook A and lever D.

The lever D is provided with a hook, $g$, at one end of it, to which a pulley-block or other object is attached, as may be desired. Said lever D has also attached to it, or is provided with, a loop or ring, $h$, into which we insert the end of a pole to raise this device up to a beam or rafter, to which it catches or hooks, and thereby suspends the pulley-block or whatever object is desired.

The ends of the hooks A and B are made sharp or pointed, so that they will catch in the sides of a beam or rafter as well as over the same.

It will be seen that by inserting the end of a pole in the loop $h$, the hook B will rest on one arm of the lever D until it is caught in or catches over a beam or rafter, when, by withdrawing the pole, the other hook A is drawn up and clasps said beam or rafter, and thereby suspends the pulley-block or other object which is hooked on to or attached to the hook $g$.

The advantages of the above-described hook or device are obvious, as by means of it the operator is enabled to attach the same to any beam or rafter without trouble or difficulty.

The lever D, being pivoted between the plate C and lower end of the lever A, is extended sufficiently far so that its end rests above the centre of the outside of the hook B. The direct action of the lever on the side of the short hook will cause the hooks to effectually grasp and penetrate the rafter, no matter what amount of weight is applied to the hook $g$.

Having thus described our invention, what we claim as new, and desire to secure by Letters Patent, is—

The combination of the hooks A and B with the lever D, the latter constructed as described, and pivoted between the plate C and lower end of the hook A, in such a manner that its outer end is extended up the side of the hook B, and made to force said hook against and penetrate the rafter as specified.

In testimony that we claim the foregoing, we have hereunto set our hands, this 4th day of April, 1868.

DAVID HICKS,
SIDNEY DOTY.

Witnesses:
A. W. BURTT,
E. F. DEWEY.